Patented July 17, 1951

2,561,010

UNITED STATES PATENT OFFICE 2,561,010

PREVENTION OF FOGGING OF TRANSPARENT PACKAGES

Clarence M. Carson, Cuyahoga Falls, Ohio, assignor to Wingfoot Corporation, Akron, Ohio, a corporation of Delaware No Drawing. Application November 13, 1946, Serial No. 709,417

6 Claims. (Cl. 206—45.31)

This invention relates to the prevention of the fogging of transparent packages of film material containing a food stuff—e. g., fruit, vegetable, meat, bakery goods, etc.—or flowers or other moisture-emitting products in an atmosphere of moist air or other gas when the temperature of such a package is cooled sufficiently to produce supersaturation of the gas and condensation of moisture on the inner surface of the wrapping material. The invention includes new film wrapping materials and packages made from them.

Moisture-resisting wrapping materials are hydrophobic or, if hydrophilic, are coated with a hydrophobic lacquer. Water condensate, forming on a hydrophobic surface, collects as droplets which befog the surface on which they form, if it be transparent. According to this invention such transparent wrapping materials are treated with a hydrophilic material which is present at the surface on which the condensate forms. As a consequence, the condensate spreads over the entire surface, rays of light passing through the wet film are all refracted at the same angle (except as the film of water may be thicker at certain places than at others), and there is no fogging.

The production of condensate is dependent upon a number of factors. Water evaporates from the contents of the package. If the packaging material is moisturetight and the air within the package is saturated or nearly saturated with water, slight cooling will cause condensate to form on the transparent film. If the per cent saturation is low, a big drop in temperature is required to produce condensate, and usually it will form when a package of fruit or vegetables, etc., which has been standing several hours at room temperature is subjected to refrigeration.

A moisturetight film is not always desirable. As the amount of condensate increases, it drips back into the package, waterlogging the contents of the package, and eventually mold and gas form. On the other hand, a film too permeable to water vapor—for example, uncoated cellophane or cellulose acetate—will permit fruit and vegetables to dry out too quickly.

The permissible moisture loss will vary. With spinach wrapped wet in a certain film and stored for two weeks at 40° F., a loss of 10 to 12 per cent by weight occurred, but the spinach was still crisp and edible. With such wet vegetables high moisture loss is desirable, and unless the film is relatively pervious to moisture, the vegetables will waterlog and decompose. Uncoated cellophane and cellulose acetate transmit moisture too rapidly, and the wet vegetables wrapped in them dry out in the course of a week or so. As measured by the standard method described herein, uncoated cellulose acetate, for example, has a moisture-transfer rate of about 1100. The film mentioned for wrapping wet spinach had a moisture-transfer rate of about 150 to 175. A hydrophilic material was incorporated in the plastic from which this film was made and was dispersed throughout the film. Although this dispersion of the hydrophilic material in the film increased the transmission of moisture through the film, this was desirable in the case mentioned. Thus, at times it may be cheaper or technically advantageous to mix the hydrophilic material with the plastic from which the film is prepared rather than to apply it to the finished packaging film. Whether the hydrophilic material be mixed with the plastic from which the film is made or applied to the surface of the finished film, it is present at the surface and causes the condensate which collects to spread over the entire inner surface of the film instead of as droplets which befog the film.

If the hydrophilic material be dispersed through the film, it increases the rate of diffusion of oxygen and carbon dioxide through the film. Most plastic films have low oxygen and carbon dioxide permeability, and such increase is desirable in order to prevent spoilage, mold formation, and physiological decomposition.

The rate of transmission of water vapor through the film is dependent upon the temperature and the relative humidities on the two sides of the film. Increase in temperature, increase in humidity inside of the package, and lowering the humidity outside of the package all accelerate the transfer of moisture through the film. By spreading the film of condensate uniformly over the inner surface of the film, the hydrophilic agent prevents fogging, and any effect the presence of a uniform coating of the condensate may have on the rate of transfer of moisture vapor through the film appears to be of minor consequence.

The surface-active agent may be applied to one or both surfaces of the film after the film has been completely fabricated. If the film is formed of a plastic which is cast from solution or extruded or the like, or if it is a lacquer film which is to be applied to cellophane or other base material, the agent may be dispersed homogeneously throughout the film mixture before it is formed into the film. No harm is done if more of the agent is used than is soluble in the film material so that a bloom of the agent forms on the film surface; provided, of course, that the bloom is not such as to interfere with the appearance, transparency or feel of the film. Cellophane, cellulose acetate, and the like coated on the inner surface or both surfaces with such a lacquer film will be nonfogging. If preferred, the hydrophilic agent may be applied to the surface of the coating, as by applying the agent dissolved in a suitable solvent.

Transparent wrapping materials which are advantageously coated to reduce their moisture-vapor-transfer rate include cellophane (regenerated cellulose), cellulose esters, such as cellulose acetate (Lumarith), etc. 300LST cellophane is in example of a coated regenerated cellulose sheet. It is coated with a wax coating. The surface-active agent may be added to the coating or otherwise applied to one or both surfaces of the coated sheet.

Plastics which may be cast or extruded for the production of transparent wrapping films include rubber hydrochloride (Pliofilm), copolymer of vinyl chloride and vinylidene chloride (Saran), polymerized ethylene (Polythene), various vinyl compositions including the plasticized polyvinyl chloride known as Vitafilm, etc. The surface-agent may be added to such film compositions before casting or extruding. If preferred, it may be applied to the completed film, as by applying a solution of the agent in a suitable liquid.

The effectiveness of any agent depends at least in part upon the composition of the film which is treated and, thus, on whether or not the entire film surface is wet by the agent. If it does not wet the entire surface, the condensate will collect in droplets. An agent which does not act very satisfactorily on one film has been found to act satisfactorily on another. The toxicity, taste, and odor of the various surface-active agents, if any, must be considered. Thus, not all hydrophilic surface-active agents are satisfactory for use on all films and for all types of packages.

Whether conditions are such as to cause fogging and, therefore, whether it is desirable to apply a surface-active agent to a given film for use in a certain packaging operation depends upon the moisture-transfer rate through the film, the nature of the material being packaged, the relative humidity of the atmosphere, and the changes in temperature to which the package is to be subjected. Furthermore, a film which vents moisture so rapidly that it is suitable for wet vegetables may not be satisfactory for cranberries; and, vice versa, a film which is sufficiently moisturetight to protect cranberries does not vent moisture rapidly enough to be suitable for wet vegetables. Thus, it is necessary to select the film and also to select the hydrophilic agent to be used in any particular operation.

*Definitions*

(1) Reference to moisture-transfer rate herein means the number of grams of moisture which pass through one square meter of film at 40° C. every twenty-four hours when the relative humidity on one side of the film is 95 per cent and the relative humidity on the other side of the film is zero.

(2) Surface-active agents referred to herein by their trade names have the chemical compositions indicated in the following table.

The table also indicates certain of the various hydrophilic materials mentioned which have been found satisfactory for use with the various film materials listed in the headings of the first ten columns. The first four columns refer to rubber hydrochloride film (Pliofilm) 0.00075 inch thick. The film referred to in the first column contained no plasticizer. That referred to in the second column contained 2.5 parts butyl stearate per 100 parts of the rubber hydrochloride. That referred to in the third column contained 15 parts butyl stearate per 100 parts rubber hydrochloride. That referred to in the fourth column contained 12 parts dibutyl phthalate and 3 parts butyl stearate per 100 parts rubber hydrochloride. The film of the fifth column was a polymerized ethylene (Polythene). The film of the sixth column is illustrative of polyvinyl films and was, in fact, a film of polyvinyl chloride (Vitafilm) which contained 7.5 parts dioctyl phthalate, 3.75 parts dibutyl sebacate, and 3.75 parts methoxyethyl acetyl ricinoleate per 100 parts of the vinyl polymer. The film of the seventh column was a mixed polymer of vinyl chloride and vinylidene chloride (Saran). Regenerated cellulose coated with a wax coating (300LST cellophane) is referred to in the eighth column. The ninth column refers to an uncoated cellulose acetate film (Lumarith). The film of the tenth column is a regenerated cellulose film coated with a nitrocellulose-wax coating (300MSAT cellophane).

| 1 | 2 | 3 | 4 | 5 | 6 | 7 | 8 | 9 | 10 | Trade Name | Chemical Name | Source |
|---|---|---|---|---|---|---|---|---|----|------------|---------------|--------|
|   |   |   |   | x |   | x | x |   |    | Aerosol OS | Alkyl aryl sulfonate | American Cyanamid Co. |
| x | x | x |   | x |   | x | x | x | x  | Aerosol OT | Dioctyl ester of sodium sulfo-succinic acid. | Do. |
|   |   |   |   | x |   | x | x | x |    | Aquarex D | Sodium alkyl sulfate | Du Pont Co. |
| x | x | x | x |   |   |   | x | x |    | Aresklene | Dibutyl phenylphenol sodium disulfonate. | Monsanto Chem. Co. |
|   |   |   |   | x |   | x |   |   |    | Areskap | Mono-butyl phenylphenol sodium monosulfide. | Do. |
|   |   |   |   |   |   | x |   |   |    | AM118 | Quaternary ammonium compound | Armour & Co. |
| x | x | x | x |   |   | x |   |   |    | AMC1 Lot 1383 | do | Do. |
|   |   |   |   | x |   |   |   |   |    | AMC1 Lot 1392 | do | Do. |
|   |   | x |   |   |   |   |   |   |    | Arctic Syntex | Sulfates of fatty acid mono-glycerides | Colgate-Palmolive-Peet Co. |
|   |   | x |   |   | x |   |   |   |    | Avitex AD | Fatty alcohol sulfate | Du Pont Co. |
| x | x | x |   | x |   | x | x |   |    | Duponol | do | Do. |
|   |   | x |   |   | x |   |   |   |    | Hytergen | Sulfated fatty acid amide | Hart Products Co. |
|   |   | x | x |   | x |   |   |   |    | Intracol | Long chain fatty acid amide | Synthetic Chemicals Inc. |
|   |   | x |   |   | x |   |   |   |    | Intramine | Sodium salt of sulfated lauryl collamide | |
| x |   | x | x | x | x | x | x | x | x  | Lecithin |   | Ross & Rowe. |
|   |   |   |   |   |   |   |   | x |    | Lupomin | Fatty acid amide salt | J. Wolfe & Co. |
| x |   | x | x | x | x | x | x | x | x  | Monosulph | Sulfonated vegetable oil | National Oil Prod. Co. |
|   |   | x |   |   |   |   |   |   |    | Naccolene F | Modified alkyl aryl sulfonate | National Aniline Co. |
|   |   |   |   | x |   |   |   |   |    | Nacconol NR | Sodium alkyl aryl sulfonate | Do. |
|   |   |   |   |   |   | x |   |   |    | Oratol 1335 | Sulfonated amide | Jacques Wolf Co. |
|   |   |   | x |   | x |   |   |   |    | Pentamul 87 | Pentaerythritol monostearate | Heyden Chem. Corp. |
|   |   |   |   |   |   |   |   |   |    | Pluramine S |   | Kearney Mfg. Co. |
| x | x | x |   |   | x |   | x |   |    | Sapamine A | Fatty acid amide acetate | Ciba Prod. Co. |
|   |   | x | x |   |   |   |   |   |    | Stablex G | Petroleum sulfonate | Heveatex Corp. |
|   | x | x | x | x |   | x | x | x |    | Span 40 | Sorbitan Monopalmitate | Atlas Powder Co. |
|   |   | x |   | x | x |   |   |   |    | Span 85 | Sorbitan trioleate |   | Do. |

| 1 | 2 | 3 | 4 | 5 | 6 | 7 | 8 | 9 | 10 | Trade Name | Chemical Name | Source |
|---|---|---|---|---|---|---|---|---|----|---|---|---|
| x |   |   |   | x | x | x | x |   | x | Tergitol 4 | Sodium salt of alkyl sulfate | Carbide & Carbon Chem. Co. |
|   |   |   |   | x |   |   |   |   |   | Tergitol 7 | ..do.. | Do. |
| x | x |   | x |   |   |   | x |   |   | Tetranol | Sulfated fatty ester | Arkansas Co. |
|   |   |   |   | x |   |   |   |   |   | Triton 720 | Sulfonated ether | Resinous Prod. Co. |
|   |   | x |   | x | x | x | x |   | x | Triton 770 | Aryl alkyl ether sulfate | Do. |
|   |   |   | x | x |   |   |   |   |   | Triton NE | Organic polyether alcohol | Do. |
|   |   |   | x | x |   | x | x |   | x | Triton W30 | Sulfated aromatic ether alcohol | Do. |
| x | x | x | x | x |   | x |   | x | x | Tween 40 | Polyoxyethylene ether of palmitic acid partial ester. | Atlas Powder Co. |
|   |   | x |   | x |   |   |   |   |   | Tween 81 | ..do.. | Do. |
|   |   | x |   |   |   |   | x |   | x | Twitchell Base #262 | Sodium sulfonates of mineral oil | Emery Industries. |
|   |   | x |   |   |   |   |   |   |   | Xynocol | Sulfate of fatty acid amide | Onyx Oil & Color Co. |

The following further illustrate the invention. In the first two examples a hydrophilic surface-active agent is employed in a moisture-resisting film of relatively high moisture-transmission rate. It not only prevents fogging but also accelerates the transmission of moisture through the film. In the other examples the moisture-transmission rate is relatively low, and the agent is applied to the surface of the film.

*Example 1*

|  | Parts by weight |
|---|---|
| Tween 40 | 3 |
| Dibutyl phthalate | 12 |
| Butyl stearate | 3 |
| Rubber hydrochloride | 100 |

The dibutyl phthalate and butyl stearate were used as plasticizers for the rubber hydrochloride and were dissolved with the rubber hydrochloride in benzene. The Tween 40 was also dissolved in benzene and mixed with the cement (solution) of plasticizer and rubber hydrochloride. Film was cast from the resulting cement, and after evaporation of the solvent, a film .00075 inch thick remained. The film had a moisture-transfer rate of 115 to 125. No fogging occurred when wet, leafy vegetables packaged in this film were subjected to refrigeration. Film of identical composition, except that it contained no Tween 40, fogged when used for packaging the same materials, under the same conditions.

*Example 2*

Rubber hydrochloride film of the same thickness was similarly prepared using only butyl stearate as plasticizer and soybean lecithin as the hydrophilic agent. The composition of the film was

|  | Parts by weight |
|---|---|
| Soybean lecithin | 3 |
| Butyl stearate | 15 |
| Rubber hydrochloride | 100 |

The moisture-transfer rate of this film is 95 to 100. It was used satisfactorily for packaging wet, leafy vegetables. The lecithin prevented fogging when the package was placed in cold storage.

When any of the following films is used for packaging, condensate which collects on the inner surface will spread over the entire surface, and there will be no fogging. In Examples 3–7 the surface-active agent is applied from water solution or dispersion. This water mixture wets the film and leaves a uniform coating of the hydrophilic agent. An organic solution or dispersion or emulsion might be used.

*Example 3*

Sapamine A (aqueous) was applied to one side of a rubber hydrochloride film which contained 2.5 parts of butyl stearate (per 100 parts rubber hydrochloride) as plasticizer. The small amount of plasticizer in this film gives it a moisture-transfer rate of only about 20.

*Example 4*

Aerosol OT (aqueous) was coated on one side of Polythene film. No fogging resulted.

*Example 5*

Polyvinyl chloride film (Vitafilm) was coated with Monosulph (aqueous). No fogging occurred. Such a film is recommended for packaging flowers.

*Example 6*

Saran was coated on the inner surface with Stablex G (aqueous). Condensate spread over the coated surface, and there was no fogging.

*Example 7*

Span 85 (aqueous) was applied to 300LST cellophane. No fogging occurred.

*Example 8*

PT cellophane was coated with a moisture-proof lacquer of the following composition:

|  | Parts by weight |
|---|---|
| Butadiene-styrene copolymer | 100 |
| Paraffin wax | 15 |
| Tween 40 | 3 |

No fogging occurred.

*Example 9*

Glassine paper was coated with a mixture of 5 parts of Avitex W in 100 parts of paraffin wax. No fogging occurred.

The foregoing are illustrative, and the invention is not limited thereto.

What I claim is:

1. Transparent rubber hydrochloride wrapping film having dispersed therein a non-toxic, tasteless and odorless hydrophilic fatty acid ester, the alcohol radical of which is a long-chain ether, with a concentration of the ester at the surface sufficient to cause water condensate formed thereon to spread over the surface of the film.

2. Transparent rubber hydrochloride wrapping film which contains non-toxic, tasteless and odorless hydrophilic long-chain ethylene ether of palmitic acid partial ester dispersed throughout the film with a concentration at the surface of the film sufficient to cause water condensate formed thereon to spread over the surface of the film.

3. A package which contains a water-emitting material and is formed of transparent rubber hydrochloride wrapping film which has at the inner surface sufficient non-toxic tasteless and odorless, hydrophilic, long-chain polyoxyethylene ether of fatty acid partial ester to cause water condensate formed thereon to spread over the surface of the film.

4. A package which contains a water-emitting material and is formed of transparent rubber hydrochloride wrapping film which has at the inner surface thereof sufficient non-toxic, tasteless and odorless, hydrophilic, long-chain polyoxyethylene ether of palmitic acid partial ester to cause water condensate formed thereon to spread over the surface of the film.

5. Transparent rubber hydrochloride wrapping film which has at at least one surface thereof sufficient non-toxic, tasteless and odorless, hydrophilic, long-chain polyoxythylene ether of a fatty acid partial ester to cause water condensate formed thereon to spread over the surface of the film.

6. Transparent rubber hydrochloride wrapping film which has at at least one surface thereof sufficient non-toxic, tasteless and odorless, hydrophilic, long-chain polyoxyethylene ether of palmitic acid partial ester to cause water condensate formed thereon to spread over the surface of the film.

CLARENCE M. CARSON.

REFERENCES CITED

The following references are of record in the file of this patent:

UNITED STATES PATENTS

| Number | Name | Date |
| --- | --- | --- |
| 2,118,262 | McGrady | May 24, 1938 |
| 2,280,055 | Anderson | Apr. 21, 1942 |
| 2,281,437 | Hershberger | Apr. 28, 1942 |
| 2,347,494 | Meigs | Apr. 25, 1944 |
| 2,374,678 | Gruenwald | May 1, 1945 |
| 2,393,863 | Myers | Jan. 29, 1946 |
| 2,395,419 | Mitchell | Feb. 26, 1946 |
| 2,404,422 | Anderson | July 23, 1946 |
| 2,416,051 | Gilbert | Feb. 18, 1947 |

Certificate of Correction

Patent No. 2,561,010                                                       July 17, 1951

CLARENCE M. CARSON

It is hereby certified that error appears in the printed specification of the above numbered patent requiring correction as follows:

Column 3, line 16, for "is in" read *is an*; line 28, for the word and hyphen "surface-" read *surface-active*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*